(12) United States Patent
Kosaka et al.

(10) Patent No.: US 7,018,669 B2
(45) Date of Patent: Mar. 28, 2006

(54) GREEN SOYBEANS WHOSE COLOR IS PREVENTED FROM DISCOLORING

(75) Inventors: Masahito Kosaka, Hachioji (JP); Tsuyoshi Koriyama, Hachioji (JP)

(73) Assignee: Nippon Suisan Kaisha, Ltd., Tokyo (JP)

( * ) Notice: Subject to any disclaimer, the term of this patent is extended or adjusted under 35 U.S.C. 154(b) by 121 days.

(21) Appl. No.: 10/634,994

(22) Filed: Aug. 6, 2003

(65) Prior Publication Data

US 2004/0062842 A1 Apr. 1, 2004

(30) Foreign Application Priority Data

Aug. 6, 2002 (JP) .............................. 2002-228111

(51) Int. Cl.
*A23L 1/20* (2006.01)
(52) U.S. Cl. ...................................... 426/634; 426/251
(58) Field of Classification Search ................ 426/634, 426/251
See application file for complete search history.

(56) References Cited

U.S. PATENT DOCUMENTS

| 2,316,458 | A | * | 4/1943 | Scalise ........................ 426/251 |
| 3,762,629 | A | * | 10/1973 | Bruno ..................... 229/87.08 |
| 6,565,911 | B1 | * | 5/2003 | Yamakawa et al. .......... 426/615 |
| 2003/0221213 | A1 | * | 11/2003 | Rommens et al. ........... 800/278 |
| 2004/0031073 | A1 | * | 2/2004 | Schmulling et al. ........ 800/287 |

FOREIGN PATENT DOCUMENTS

| JP | 56-1846 | * | 1/1981 |
| JP | 6-7083 |   | 1/1994 |
| JP | 8-56610 |   | 3/1996 |
| JP | 8-242799 | * | 9/1996 |
| JP | 10-304820 |   | 11/1998 |

OTHER PUBLICATIONS

U.S. SoyFoods Directory, Indiana Soybean Board [online]. [Retrieved on Jan. 29, 1999]. Retrieved from the Internet <URL: http://web.archive.org/web/19990129020640/http://www.soyfoods.com/soyfoodsdescriptions/descriptions.html>.*

Y. Kitada et al., *Determination of ι-Ascorbic Acid, Tocopherol, Carotene and Chlorophyll in Various Teas*, Nippon Shokuhin Kogyo Gakkaishi (Journal of Japanese Society of Food Industry) vol. 36, No. 11, pp. 927-933 (1989).

Y. Izaki et al., *Chlorophylls, Carotenes and Tocopherols in Green Vegetables and Their Relationships*, Journal of Japanese Society of Nutrition and Food Science vol. 39, No. 6, pp. 485-493 (1986).

* cited by examiner

*Primary Examiner*—Anthony Weier
(74) *Attorney, Agent, or Firm*—Westerman, Hattori, Daniels & Adrian, LLP

(57) ABSTRACT

A green soybean having a deep green color, prevented from discoloring, and being adaptable for chilled distribution is provided as a cooked and frozen product. The green soybean is hard to discolor and is frozen after cooking. The green color is retained even in a condition exposed to illumination of light. The green soybean contains chlorophyll a of not less than 3.8 g/100 g wet weight. A material for suppressing decomposition of chlorophyll, preferably an anti-oxidation material, e.g., β-carotene, is accumulated in tissues of the green soybean. Preferably, β-carotene of not less than 750 μg/100 g wet weight is accumulated in the green soybean. The invention also provides a green soybean thawed from the frozen green soybean. The thawed green soybean is adaptable for chilled distribution.

16 Claims, 1 Drawing Sheet

GREEN SOYBEANS WHOSE COLOR IS PREVENTED FROM DISCOLORING

BACKGROUND OF THE INVENTION

1. Field of the Invention

The present invention relates to a green soybean whose green color is prevented from discoloring and a cooked and frozen product thereof. More particularly, the present invention relates to a deep-green soybean in which a green color is retained even in a condition exposed to illumination of light. Even more particularly, the present invention relates to a green soybean which contains chlorophyll a of not less than 3.8 g/100 g wet weight and/or a material accumulated in tissues for suppressing decomposition of chlorophyll, as well as to a green soybean in which an anti-oxidation material, e.g., β-carotene, is contained especially in a pod in a more amount. Further, the present invention relates to a product distributable under the chilled condition of these green soybeans.

2. Description of the Related Art

Recently, cooked green soybeans have been distributed in markets in the form of frozen or thawed products, and have been produced in an increasing amount because of convenience in handling. However, chlorophyll contained as a green color component in green soybeans is unstable for various reasons and tends to easily decompose by external factors. Considering the stability of chlorophyll from the viewpoint of temperature zones during the distribution, when products of frozen green soybeans are held at a temperature of −20° C. in a dark place, the problem of discoloration of the green basically does not arise, but when the products are exposed to illumination of light, there arises the problem of discoloration of the green. On the other hand, when frozen products of cooked green vegetables are thawed and preserved in a chilled temperature zone lower than the normal temperature under illumination of light, a vegetable's green color fades hour by hour and day by day. Such discoloration gives rise to a serious problem in processes of production and distribution because a commodity value of cooked green vegetables lowers noticeably with the discoloration. As hitherto known in the art, a major factor of discoloring the green is light and it is very difficult to retain the green, particularly, in the chilled temperature zone. Although the green can be retained to some extent by shielding off light, this solution is disadvantageous in that the condition of the products cannot be confirmed by looking at the inside of the package and consumers lose one of the ways of checking product quality. When the products are lay out for sale at shop without shielding off light, they are placed under illumination of light all day and therefore the discoloration of green is serious.

It is known that retention of a vegetable's green color is greatly affected by temperature and moisture (see "Handbook of Techniques for Packing Functional Foods"). For the purpose of retaining and protecting the green in a frozen temperature zone, a vacuum packing method or a gas replacing method has been developed (see Japanese Unexamined Patent Application Publication No. 56-1846). When green vegetables are preserved in a dark place under a frozen condition of lower than −20° C., the reaction temperature is low and hence discoloration of the vegetable's green does not cause a problem in practice. When green vegetables are held in showcases, etc. under illumination of light or at temperatures of higher than −20° C., the effect of retaining the green color is confirmed with such a method.

For the purpose of preventing discoloration of cooked vegetables especially in the chilled temperature zone in which the discoloration occurs noticeably, a method using a protamine solution (Japanese Unexamined Patent Application Publication No. 6-7083), a method of adding kojic acid, etc. (Japanese Unexamined Patent Application Publication No. 8-56610), and a method using calcium salts have been invented in the past. However, the effect of any of those methods is not sufficient and further development of the technology is demanded. In addition, a vacuum packing method or a gas replacement packing method has been developed (Japanese Unexamined Patent Application Publication No. 10-304820). Although the effect of that method is relatively significant, that method requires special equipment and gives rise to a problem of cost efficiency.

SUMMARY OF THE INVENTION

In view of the state of the art set forth above, the inventors have conducted intensive studies and have found green vegetables whose green color is prevented from discoloring even when cooked. Based on the finding, an object of the present invention is to provide a green soybean, whose green color is prevented from discoloringtant to discolor during preservation not only through a series of steps of cooking, freezing and illumination of light in frozen distribution, but also through subsequent steps of heating (thawing) or illumination of light in chilled distribution, and a cooked and frozen product thereof. In other words, an object of the present invention is to provide a green soybean which has a deep green color, is protected against discoloration, and is a cooked and frozen product being adaptable for frozen and/or chilled distribution.

More specifically, an object of the present invention is to provide a green soybean wherein a green color is retained even in a condition exposed to illumination of light. Another object of the present invention is to provide a deep-green soybean which contains chlorophyll a of not less than 3.8 g/100 g wet weight and/or a material accumulated in tissues for suppressing decomposition of chlorophyll, as well as a deep-green soybean in which an anti-oxidation material, e.g., β-carotene, is contained especially in a pod in a more amount. Still another object of the present invention is to provide a green soybean thawed from the frozen green soybean and being adaptable for chilled distribution.

The first aspect of the present invention is a method of producing a boiled green soybean being preserved and/or sold under illumination of light and being suitable for chilled distribution, the method comprising the step of selecting a green soybean containing chlorophyll a of not less than 3.8 g/100 g wet weight, or using a green soybean cultivated to contain chlorophyll a of not less than 3.8 g/100 g wet weight.

The second aspect of the present invention is a method of producing a boiled green soybean being preserved and/or sold under illumination of light and being suitable for chilled distribution, the method comprising the step of selecting a green soybean containing β-carotene of not less than 750 µg/100 g wet weight, or using a green soybean cultivated to contain β-carotene of not less than 750 µg/100 g wet weight.

The third aspect of the present invention is a method of producing a boiled green soybean being preserved and/or sold under illumination of light and being suitable for chilled distribution, the method comprising the step of selecting a green soybean containing chlorophyll a of not less than 3.8 g/100 g wet weight and β-carotene of not less than 750 µg/ 100 g wet weight, or using a green soybean cultivated to contain chlorophyll a of not less than 3.8 g/100 g wet weight and β-carotene of not less than 750 µg/100 g wet weight.

The fourth aspect of the present invention is a method of producing a boiled green soybean according to any one of first to third aspects, wherein a cultivating method for increasing the content of chlorophyll and β-carotene in the green soybean is to widen an interval between roots.

The fifth aspect of the present invention is a method of producing a boiled green soybean according to any one of first to third aspects, wherein a cultivating method for increasing the content of chlorophyll and β-carotene in the green soybean is to employ a low-phosphate fertilizer.

The sixth aspect of the present invention is a method of producing a boiled green soybean according to any one of first to fifth aspects, wherein the green soybean preserved and/or sold under illumination of light and being suitable for chilled distribution is preserved and sold for 24 hours or longer under illumination of light.

The present invention provides a green soybean wherein a green color is prevented from discoloring.

The present invention provides a green soybean as a cooked and frozen product. In this case, the present invention provides a cooked and frozen green soybean whose green color is prevented from discoloring.

The present invention provides a green soybean wherein the green color is retained even in a condition exposed to illumination of light. In this case, the present invention provides a green soybean wherein the green color is retained even in a condition exposed to illumination of light and hence the green color is hard to discolor, and wherein the soybean is, as required, a cooked and frozen product. With those features, the present invention can provide a green soybean which is able to retain a green color even when frozen after cooking, thawed and held under illumination of light, and which has an excellent beautiful appearance.

Further, the present invention provides a green soybean which has a deep green color and contains chlorophyll of not less than 3.8 g/100 g wet weight. Thus, the present invention provides a deep-green soybean which contains chlorophyll of not less than 3.8 g/100 g wet weight and in which the green color is prevented from discoloring.

The present invention provides a green soybean as a cooked and frozen product. In this case, the present invention provides a green soybean in the form of a cooked and frozen product, which has a deep green color and contains chlorophyll of not less than 3.8 g/100 g wet weight, and in which the green color is prevented from discoloring.

The present invention provides a green soybean wherein the green color is retained even in a condition exposed to illumination of light. In this case, the present invention provides a green soybean in which the green color is retained even in a condition exposed to illumination of light, which has a deep green color and contains chlorophyll of not less than 3.8 g/100 g wet weight, and in which the green color is prevented from discoloring and the soybean is, as required, a cooked and frozen product.

Still further, the present invention provides a green soybean which contains a material accumulated in tissues, preferably a pod, for suppressing decomposition of chlorophyll, specifically an anti-oxidation material and more specifically β-carotene, the β-carotene being preferably accumulated not less than 750 µg/100 g wet weight.

Thus, the present invention provides a green soybean which contains a material accumulated in tissues, preferably a pod, for suppressing decomposition of chlorophyll, specifically an anti-oxidation material and more specifically β-carotene, the β-carotene being preferably accumulated not less than 750 µg/100 g wet weight, and in which the green color is prevented from discoloring.

The present invention provides a green soybean as a cooked and frozen product. In this case, the present invention provides a green soybean in the form of a cooked and frozen product, which contains a material accumulated in tissues, preferably a surface skin, for suppressing decomposition of chlorophyll, specifically an anti-oxidation material and more specifically β-carotene, the β-carotene being preferably accumulated not less than 750 µg/100 g wet weight, and in which the green color is prevented from discoloring.

The present invention provides a green soybean wherein the green color is retained even in a condition exposed to illumination of light. In this case, the present invention provides a green soybean which contains a material accumulated in tissues, preferably a pod, for suppressing decomposition of chlorophyll, specifically an anti-oxidation material and more specifically β-carotene, the β-carotene being preferably accumulated not less than 750 µg/100 g wet weight, in which the green color is retained even in a condition exposed to illumination of light and hence the green color is prevented from discoloring, and in which the soybean is, as required, a cooked and frozen product.

Still further, the present invention provides a green soybean which has a deep green color and contains chlorophyll of not less than 3.8 g/100 g wet weight. In this case, the present invention provides a green soybean which contains a material accumulated in tissues, preferably a pod, for suppressing decomposition of chlorophyll, specifically an anti-oxidation material and more specifically β-carotene, the β-carotene being preferably accumulated not less than 750 µg/100 g wet weight, which has a deep green color and contains chlorophyll of not less than 3.8 g/100 g wet weight, in which the green color is retained even in a condition exposed to illumination of light and hence the green color is prevented from discoloring, and in which the soybean is, as required, a cooked and frozen product.

Still further, the present invention provides a green soybean which is obtained by thawing the above-mentioned green soybean in the form of a cooked and frozen product, and which is adaptable for chilled distribution.

DESCRIPTION OF THE PREFERRED EMBODIMENTS

Figure 1:
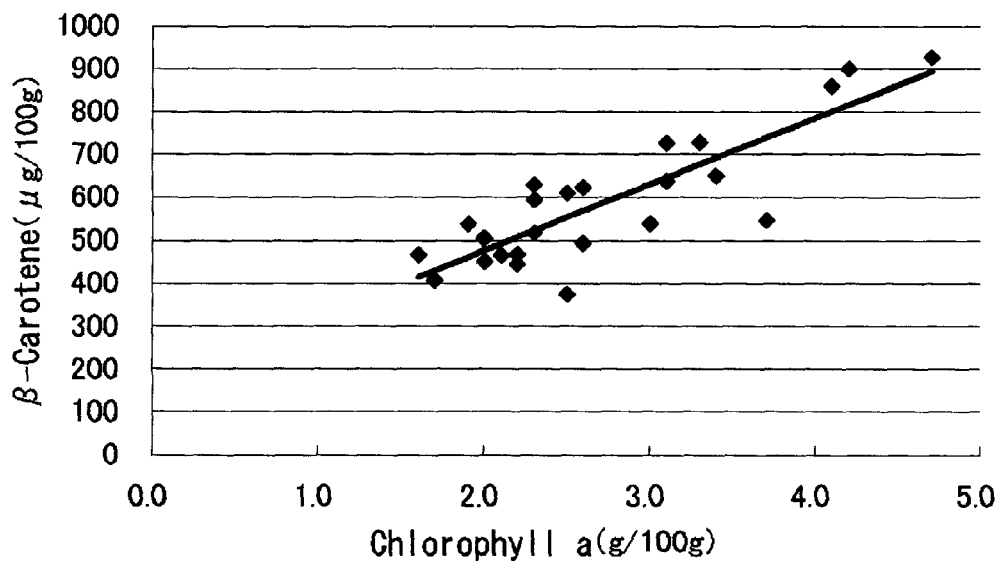
FIG. 1 is a graph showing the correlation between contents of β-carotene and chlorophyll α.

The present invention is concerned with a green soybean whose green color is prevented from discoloring, and with a cooked and frozen product thereof. The cooking can be performed without being limited to a particular heating apparatus, a heating method, and conditions, such as temperature, so long as the heating is performed in an ordinary manner. When carrying out blanching as one example of cooking, a boiling solution for use in the blanching is preferably water or a saline solution. The green soybean of the present invention is prevented from discoloring even after being cooked by such a heating method. The present invention also includes a frozen green soybean that has been frozen after the blanching.

In the green soybean of the present invention, the green color is retained even in a condition exposed to illumination of light. An index of retention of the green color is defined as a time during which a certain level of green is retained under illumination of light (hereinafter referred to also as a "shelf life"). More specifically, the shelf life indicates a preservation time which is a required time for the yellowish index to reach 150 when a cooked and frozen green soybean is thawed and kept at 10° C. under illumination of light of 1600 Lux. The green soybean of the present invention, whose green color is prevented from discoloring under illumination of light, has the shelf life of not shorter than 26 hours.

The green soybean of the present invention contains chlorophyll α of not less than 3.8 g/100 g wet weight, in particular preferably not less than 4.0 g/100 g wet weight. A method of measuring the content of chlorophyll is not limited to a particular one so long as the content of chlorophyll is measured in an ordinary manner. In the present invention, the content of chlorophyll is measured in accordance with the method defined in "Plant Physiol.", 77, 483–485 (1985). More specifically, a tissue piece to be measured is immersed in DD-dimethylformamide and is left to stand for one day in a cold and dark place. Thus chlorophyll is extracted and the absorbance of the extracted solution is measured at 647 nm and 664.5 nm using a photospectrometer. Then, the contents of chlorophyll a (Chl. a) and chlorophyll b (Chl. b) are calculated based on calculation formulae given below:

content (mg/ml) of chlorophyll $a$=20.7×(absorbance at 647 nm)−4.62×(absorbance at 664.5 nm)  (1)

content (mg/ml) of chlorophyll $b$=12.7×(absorbance at 664.5 nm)−2.79×(absorbance at 647 nm)  (2)

In the green soybean of the present invention, a material for suppressing decomposition of chlorophyll is contained in tissues. The material for suppressing decomposition of chlorophyll is not limited to a particular one and is preferably an anti-oxidation material, in particular preferably β-carotene. The content of β-carotene is not less than 750 μg/100 g wet weight, in particular preferably not less than 860 μg/100 g wet weight. To efficiently and effectively develop the effect of the present invention, a portion where the anti-oxidation material, such as β-carotene, is to be accumulated is important. From this point of view, the present invention is featured in that the material for suppressing decomposition of chlorophyll is accumulated in a pod (surface skin). In green soybeans, pods are directly exposed to a much amount of light in comparison with beans, and therefore chlorophyll contained in the pods is remarkably susceptible to decomposition under the action of light. Stated another way, the portion where the anti-oxidation material is to be accumulated for providing the effect of retaining the green color is required to be not a bean itself, but a pod.

The method of measuring the content of β-carotene is not limited to a particular one so long as the content of β-carotene is measured in an ordinary manner. In the present invention, the content of β-carotene is measured in accordance with the method stated in "Explanation of Food Standard Component Table Analysis Manual in Japan, 5th Edition", (Chuo Hoki Publishing Co., Ltd., pp. 131–138). More specifically, a sample is shaken in a mixed solution of hexane/ethanol/acetone/toluene, including pyrogallol, and then treated with ultrasonic waves. After leaving the solution to stand in a dark place over night, β-carotene is extracted. The extracted solution is suspended in a solution of 60% potassium hydroxide, and β-carotene is extracted again using a mixed solution of hexane/ethyl acetate. After removing the solvent, the extract is dissolved in ethanol and the content of β-carotene is measured using HPLC.

Generally, in green plants, a large amount of β-carotene is contained in tissues that are highly sensitive to light and are growing day by day, e.g., leaves, above all in chloroplasts in which chlorophyll is locally present (see "Journal of Japanese Society of Food Industry", Vol. 36, No. 11, 927–933 (1989) and "Journal of Japanese Society of Nutrition and Food Science", Vol. 39, No. 6, 485–493(1986)). In view of the above, the inventors built up a hypothesis that, by producing β-carotene having a high anti-oxidation action during a growing stage through management of cultivation, the produced β-carotene directly affects decomposition of chlorophyll in the chloroplasts and provides a sufficient effect of retaining a green color. Based on such a hypothesis, the inventor developed a cultivating method for accumulating β-carotene, and as a result succeeded in growing a green soybean which has a deep green color and can retain the green color for a long time, thereby accomplishing the present invention.

The green soybean of the present invention is grown within a certain range of cultivating conditions so that a food product having a deep green color and being prevented from discoloring is produced. Taking a green soybean as an example, the present invention is featured in a fertilizing method and a seeding method.

When cultivating green soybeans, an NPK ratio (i.e., a nitrogen/phosphate/potash ratio) in a total fertilizer amount changes variously depending on soil and climate, but it is said that a general ratio is about 1:4:3 (5:20:15 kg/10a). The present invention is featured in that the NPK ratio is selected to have a lower content of phosphate and higher contents of potash and nitrogen than the general NPK ratio, in particular preferably the NPK ratio=17:6.5:22 kg/10a. The fertilizing method is not limited to a particular one so long as the fertilizer is put in a normal manner. Preferably, the fertilizer is put so as to cover a whole layer.

Consider here the action of β-carotene upon decomposition of chlorophyll in the green soybean of the present invention in which a green color is prevented from discoloring.

The relationship between β-carotene and chlorophyll will be first described.

When a large amount of chlorophyll is contained in tissues, the speed of photosynthesis increases and therefore a larger amount of oxygen than in a normal state is generated in a living body. If the oxygen content increases, oxygen present in the living body tends to change into active oxygen, and radicals induced from the active oxygen act to oxidize metabolic materials (liposoluble materials) in tissues, particularly chloroplasts, in a chain-reacting way. Accordingly, an increase of the oxygen content resulting from an increased amount of chlorophyll is highly toxic to plants. In other words, such a situation can be regarded as one kind of stress caused by oxygen. Hence, as a result of a living body protecting action occurred to avoid troubles caused by oxygen in the living body, various anti-oxidation materials, including β-carotene, are produced in the chloroplasts and serve to develop such a living body protecting function as removing radicals generated by active oxygen (see Osamu Shigenoka, "Protein, Nucleic Acid & Enzyme", 43, 634–648(1988)). It can be thus said that, by accumulating a large amount of chlorophyll in tissues, a large amount of β-carotene is also in the nature of things.

An index of indicating a certain level of green can be given as a value of L*×b*/a* (hereinafter referred to as a "yellowish index") in a pod surface. A lower yellowish index indicates a larger content of chlorophyll. This can be supported by the correlation between values of the yellowish index in pod surfaces of various green soybeans and the contents of chlorophyll, which are obtained from measuring those parameters.

The yellowish index measured in the present invention means a value calculated from a result obtained by measuring the L*·b*·a* value in the pod surface with a chromometer (CR-200 made by Minolta Co., Ltd.).

The present invention is based on the conception that decomposition of chlorophyll can be prevented by capturing radicals which induce the chain reaction of decomposing chlorophyll due to light and oxidation. The decomposition of chlorophyll is divided into two types, i.e., one requiring no oxygen, in which radicals are induced from lipid molecules, and the other requiring oxygen, in which hydroperoxides are induced through reactions with oxygen. The radical chain reaction takes part in any of those two types, and therefore means for capturing the radicals is expected to be highly effective.

To describe the relationship among light, oxygen and chlorophyll, the reaction between light and chlorophyll occurs through two routes, i.e., one expressed by a formula Type-1 given below and the other expressed by a formula Type-2 given below. In those formulae, P represents chlorophyll (material containing a porphyrin ring), RH represents lipid, R. represents a lipid radical, and ROOH represents a hydroperoxide.

Formula Type-1

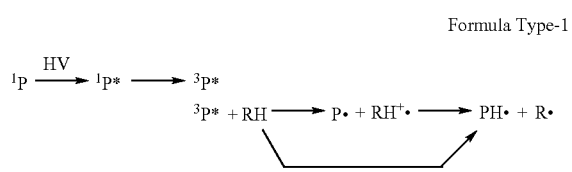

P: chlorophyll (material containing a porphyrin ring)
RH: lipid
R.: lipid radical Formula Type-2

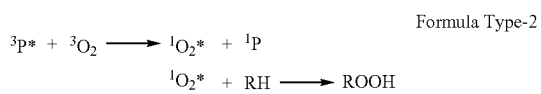

P: chlorophyll (material containing a porphyrin ring)
RH: lipid
R.: lipid radical
ROOH: lipid hydroperoxide Chlorophyll (P) is excited ($^1P^*$) by light (hv) and converted into an excited triplet sensitization material ($^3P^*$). In the formula Type-1, the sensitization material extracts a hydrogen radical (H.) from a lipid molecule (RH) and a radical (R.) is produced in lipid, whereupon other materials including chlorophyll start automatic oxidization. In the formula Type-2, the sensitization material reacts with oxygen (O) to produce excited singlet oxygen (O*), which reacts with a lipid molecule to produce a hydroperoxide (ROOH). This hydroperoxide induces the radical chain reaction, whereupon other materials including chlorophyll start automatic oxidization. Taking a green soybean as an example, a decomposition mechanism of chlorophyll in a pod by light possibly occurs in two ways expressed by the formulae Type-1 and Type-2. It is however thought that, regardless of which one of the mechanisms occurs, decomposition of chlorophyll can be suppressed by capturing or eliminating the radicals, which promote the decomposition of chlorophyll, with β-carotene.

EXAMPLES

The present invention will be described in more detail below in connection with Examples. It is to be noted that the following Examples are described merely by way of example and the present invention is in no way restricted by the following Examples.

Example 1

(Tests on Suppression of Discoloration of Green Soybean)

A test for suppressing discoloration of a green color was made by immersing green soybeans in aqueous solutions of various anti-oxidation materials, such as ascorbic acid, tocopherol and carotenoids, thus causing the anti-oxidation materials to permeate into tissues under depressurization and to capture radicals inducing decomposition of chlorophyll. However, the effect of those anti-oxidation materials was hardly confirmed.

Next, to check the effect resulting when anti-oxidation materials permeated into tissues, particularly chloroplasts, of a living body, a test for suppressing discoloration of a green color was made by preparing a chlorophyll/ethanol solution including chlorophyll, dissolving each of various anti-oxidation materials in the solution, and preserving it under illumination of light. More specifically, 4 ml of the chlorophyll/ethanol solution was prepared by adding 25 μg of chlorophyll in 1 ml of ethanol, and each anti-oxidation material, i.e., 0.01 M of ascorbic acid (aqueous solution), 0.01 M of α-tochopherol (ethanol solution), and 0.01 M of β-carotene (ethanol solution), was dissolved in the chlorophyll/ethanol solution. After enclosing each test sample, the test sample was preserved at 10° C. for 17 hours under 1600 Lux. Then, a change in absorbance of the test sample at 640 nm between before and after the preservation was measured. Measured results are shown in Table 1 given below. A higher value of the absorbance at 640 nm means a larger amount of chlorophyll. In Table 1, "control sample" represents a sample in which water was added, and "suppression effect" represents a chlorophyll reduction rate of each test sample calculated on condition that a chlorophyll reduction rate of the control sample after the preservation under illumination of light was assumed to be 100.

TABLE 1

|  | Suppression Effect (%) |
| --- | --- |
| Control sample | 0 |
| Ascorbic acid aqueous solution | 0 |
| α-Tochopherol/ethanol solution | 52.4 |
| β-Carotene/ethanol solution | 56.1 |

As a result, an apparent effect of retaining a green color against light was confirmed with addition of α-tochopherol or β-carotene. In other words, it was confirmed that a most important point in realizing optimum means for providing the green retention effect is to accumulate any of anti-oxidation materials, such as carotenoids, in tissues, thus causing chlorophyll and the anti-oxidation material to coexist in the tissues.

Example 2

(Effect of Retaining Green Color of Green Soybean Depending on Cultivating Conditions)

To obtain the effect of planting density, the cultivating condition regarding a root interval for green soybeans was enlarged from an conventional interval of 6 to 8 cm to an interval of 11 to 13 cm. More specifically, a sort of green soybean called "ryokkou (green light)" was employed and cultivated in two groups, i.e., one in which the root interval was set to the range of 6 to 8 cm (control group) and the other in which the root interval was set to the range of 11 to 13 cm (inventive group). The planting density was 2860 roots/10a in the control group and 1820 roots/10a in the inventive group. The content of β-carotene, the content of chlorophyll a, the yellowish index, and the shelf life of pods of the green soybeans cultivated under the above-described conditions were measured. The content of β-carotene was measured in accordance with the method stated in "Explanation of Food Standard Component Table Analysis Manual in Japan, 5th Edition", (Chuo Hoki Publishing Co., Ltd., pp. 131–138). More specifically, 100 g wet weight of each sample was shaken in a mixed solution of hexane/ethanol/acetone/toluene, including pyrogallol, and then treated with ultrasonic waves. After leaving the solution to stand in a dark place over night, β-carotene was extracted. The extracted solution was suspended in a solution of 60% potassium hydroxide, and β-carotene was extracted again using a mixed solution of hexane/ethyl acetate. After removing the solvent, the extract was dissolved in ethanol and the content of β-carotene was measured using HPLC. The content of chlorophyll a was measured in accordance with the method defined in "Plant Physiol.", 77, 483–485 (1985). More specifically, 100 g wet weight of a tissue piece was immersed in DD-dimethylformamide and was left to stand for one day in a cold and dark place. Then, chlorophyll was extracted and the absorbance of an extracted solution was measured at 647 nm and 664.5 nm using a photospectrometer. Then, the contents of chlorophyll a (Chl. a) and chlorophyll b (Chl. b) were calculated based on the calculation formulae (1) and (2) given above. The yellowish index was calculated based on $L^* \times b^*/a^*$ using a result obtained by measuring the $L^* \cdot b^* \cdot a^*$ value in the pod surface with a chromometer (CR-200 made by Minolta Co., Ltd.). The shelf life was obtained by measuring a preservation time during which the yellowish index reached 150 at 10° C. under illumination of light of 1600 Lux. Measured results are shown in Table 2 given below.

TABLE 2

|  | Content of β-carotene (μg/100 g wet weight) | Content of chlorophyll a (g/100 g wet weight) | Yellowish index of pod | Shelf life (hour) |
| --- | --- | --- | --- | --- |
| Control group | 540 | 2.2 | 102 | 13 |
| Inventive group | 860 | 4.1 | 81 | 28 |

As a result, it was confirmed that, with the enlarged root interval, the content of β-carotene was increased, deeper green was obtained, and the green color was retained. This result is presumably attributable to the reason as follows. Because the root interval is highly related to the luminous intensity of light, the enlarged root interval increases the luminous intensity of light, and the increased speed of photosynthesis promotes production of chloroplasts, thereby inducing an increase of the contents of both chlorophyll and β-carotene. Consequently, the green color of pods of the green soybeans is retained for a relatively long time.

Also, a similar test was conducted for another sort of green soybean called chamame (brown bean). As a result, an increase of the contents of both β-carotene and chlorophyll a was confirmed.

Example 3

(Effect of Retaining Green Color of Green Soybean Depending on Fertilizing Conditions)

In a similar way to that in Example 2, the tests were conducted except for setting the NPK ratio=5:20:15 kg/10a (control group) and the NPK ratio=17:6.5:22 kg/10a (inventive group) in the fertilization control. Measured results are shown in Table 3 given below.

TABLE 3

|  | Content of β-carotene (μg/100 g wet weight) | Content of chlorophyll a (g/100 g wet weight) | Yellowish index of pod | Shelf life (hour) |
| --- | --- | --- | --- | --- |
| Control group | 540 | 2.2 | 102 | 13 |
| Inventive group | 927 | 4.7 | 78 | 30 |

As a result, in the inventive group, green soybeans containing a larger amount of β-carotene and having a deeper green color which is prevented from discoloring were obtained. This result is presumably attributable to the reason as follows. An increase of iron in tissues induces intermediate metabolic materials for biosynthesis of chlorophyll and therefore the biosynthesis of chlorophyll is activated so as to promote accumulation of β-carotene. About 4% of iron is generally contained in soil, and a reduction of the phosphate content creates an environment in which the green soybeans tend to more easily absorb iron. The biosynthesis of chlorophyll is activated because of not only such an environment, but also an increase of the nitrogen content.

Also, a similar test was conducted for another sort of green soybean called chamame (brown bean). As a result, an increase of the contents of both β-carotene and chlorophyll a was confirmed.

Example 4

(Comparison with Conventional Products)

Figure 2:
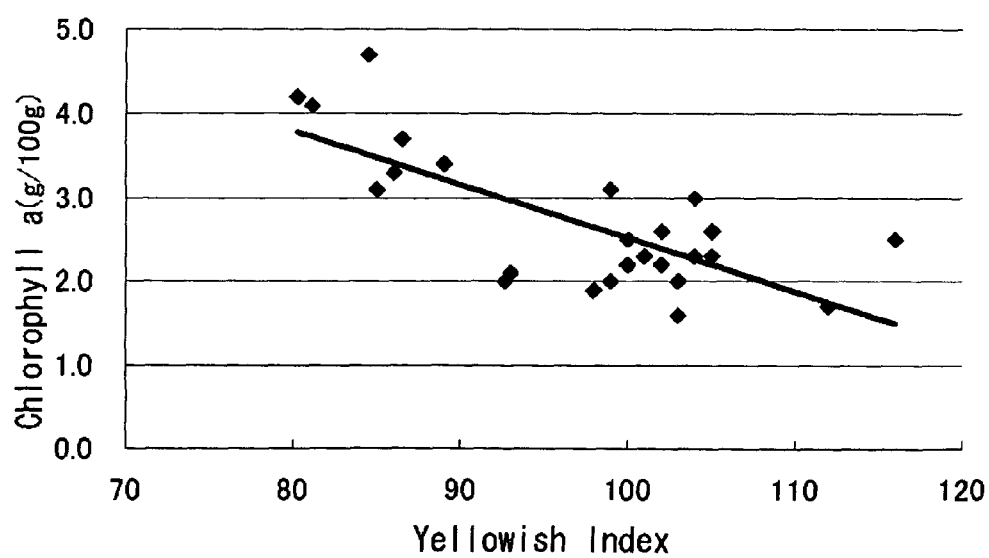
FIG. 2 is a graph showing the correlation between a content of chlorophyll α and a yellowish index.

The content of β-carotene, the content of chlorophyll a, the yellowish index, and the shelf life were measured in the same way as that in Example 2 for inventive products (two sorts of green soybean called ryokkou (green light) and chamame (brown bean)) obtained in Example 2 and 22 kinds of conventional products (ryokkou and chamame). Samples used in this Example 4 were all cooked and frozen products and were subjected to the measurement after thawing them. Measured results are shown in Table 4 given below and FIGS. 1 and 2 attached as separate sheets.

TABLE 4

| Test groups | Commodities | Country of production | Content of β-carotene (μg/100 g wet weight) | Content of chlorophyll a (g/100 g wet weight) | Yellowish index | Shelf life (hour) |
|---|---|---|---|---|---|---|
| Inventive group 1 | Example 2; ryokkou | Taiwan | 900 ± 51.6 | 4.2 ± 0.06 | 80 | 28 |
| Inventive group 2 | Example 2: ryokkou | Taiwan | 860 ± 13.4 | 4.1 ± 0.17 | 81 | 28 |
| Inventive group 3 | Example 2: chamame | Taiwan | 927 ± 24.7 | 4.7 ± 0.27 | 85 | 26 |
| Control group 1 | Product 1 of company A (ryokkou) | Indonesia | 547 ± 16.3 | 3.7 ± 0.04 | 87 | 18 |
| Control group 2 | Product 2 of company B (ryokkou) | China | 638 ± 7.1 | 3.1 ± 0.07 | 99 | 16 |
| Control group 3 | Product 3 of company B (ryokkou) | Taiwan | 467 ± 2.8 | 1.6 ± 0.17 | 103 | 12 |
| Control group 4 | Product 4 of company B (ryokkou) | China | 630 ± 20.5 | 2.3 ± 0.00 | 101 | 14 |
| Control group 5 | Product 5 of company B (chamame) | China | 624 ± 24.7 | 2.6 ± 0.09 | 105 | 14 |
| Control group 6 | Product 6 of company B (ryokkou) | Taiwan | 594 ± 2.8 | 2.3 ± 0.11 | 104 | 13 |
| Control group 7 | Product 7 of company B (ryokkou) | Taiwan | 468 ± 16.3 | 2.2 ± 0.07 | 102 | 13 |
| Control group 8 | Product 8 of company B (chamame) | Taiwan | 539 ± 17.7 | 3.0 ± 0.37 | 104 | 15 |
| Control group 9 | Product 1 of company C | Taiwan | 407 ± 8.5 | 1.7 ± 0.04 | 112 | 9 |
| Control group 10 | Product 1 of company D (chamame) | Taiwan | 374 ± 20.5 | 2.5 ± 0.08 | 116 | 10 |
| Control group 11 | Product 1 of Company B | Thailand | 727 ± 39.6 | 3.1 ± 0.08 | 85 | 22 |
| Control group 12 | Product 1 of company F (ryokkou) | China | 467 ± 6.4 | 2.1 ± 0.10 | 93 | 19 |
| Control group 13 | Product 1 of company F (chamame) | China | 518 ± 15.6 | 2.3 ± 0.09 | 105 | 15 |
| Control group 14 | Product 1 of company G | Taiwan | 651 ± 38.9 | 3.4 ± 0.21 | 89 | 21 |
| Control group 15 | Product 2 of company G (ryokkou) | China | 729 ± 241 | 3.3 ± 0.20 | 86 | 23 |
| Control group 16 | Product 3 of company G | Taiwan | 494 ± 48.1 | 2.6 ± 0.40 | 102 | 13 |
| Control group 17 | Product 1 of company H | China | 506 ± 3.5 | 2.0 ± 0.16 | 99 | 17 |
| Control group 18 | Product 1 of company I | China | 610 ± 19.8 | 2.5 ± 0.00 | 100 | 15 |
| Control group 19 | Product 1 of company J | China | 445 ± 30.4 | 2.2 ± 0.07 | 100 | 16 |
| Control group 20 | Product 1 of company K | Thailand | 452 ± 9.2 | 2.0 ± 0.18 | 103 | 15 |
| Control group 21 | Product 1 of company L (ryokkou) | Taiwan | 504 ± 18.4 | 2.0 ± 0.16 | 93 | 18 |
| Control group 22 | Product 1 of company M | Taiwan | 539 ± 15.6 | 1.9 ± 0.15 | 98 | 16 |

As a result, it was confirmed that the contents of both β-carotene, and chlorophyll in the inventive products were higher than those in the conventional products (Table 4). Also, the correlation between the contents of chlorophyll and β-carotene (FIG. 1) and the correlation between the content of chlorophyll and the yellowish index (FIG. 2) were confirmed.

As fully described above, the present invention is able to provide green vegetables, whose green color is prevented from discoloring during preservation through not only a series of steps of cooking, freezing and illumination of light in frozen distribution, but also through a series of steps of cooking, freezing, thawing and illumination of light in chilled distribution. In other words, the present invention is able to provide a green soybean and a product of the green soybean frozen after cooking, which have a deep green color, are protected against discoloration, are adaptable for frozen and/or chilled distribution, and have an excellent beautiful appearance.

What is claimed is:

1. A method of producing a boiled green soybean being preserved and/or sold under illumination of light and being suitable for chilled distribution, the method comprising the step of
   selecting a green soybean containing chlorophyll a of not less than 3.93 g/100 g wet weight, or
   using a green soybean cultivated to contain chlorophyll a of not less than 3.93 g/100 g wet weight.

2. A method of producing a boiled green soybean according to claim 1, wherein the green soybean is cultivated with an interval of 11 cm or more between roots.

3. A method of producing a boiled green soybean according to claim 1, wherein the green soybean is cultivated with a low-phosphate fertilizer.

4. A method of producing a boiled green soybean according to claim 1, wherein the green soybean is preserved for 24 hours or longer under illumination of light.

5. A method of producing a boiled green soybean being preserved and/or sold under illumination of light and being suitable for chilled distribution, the method comprising the step of
   selecting a green soybean containing β-carotene of not less than 846.6 μg/100 g wet weight, or
   using a green soybean cultivated to contain β-carotene of not less than 846.6 μg/100 g wet weight.

6. A method of producing a boiled green soybean according to claim 5, wherein the green soybean is cultivated with an interval of 11 cm or more between roots.

7. A method of producing a boiled green soybean according to claim 5, wherein the green soybean is cultivated with a low-phosphate fertilizer.

8. A method of producing a boiled green soybean according to claim 5, wherein the green soybean is preserved for 24 hours or longer under illumination of light.

9. A method of producing a boiled green soybean being preserved and/or sold under illumination of light and being suitable for chilled distribution, the method comprising the step of selecting a green soybean containing chlorophyll a of not less than 3.8 g/100 g wet weight and β-carotene of not less than 750 μg/100 g wet weight, or using a green soybean cultivated to contain chlorophyll a of not less than 3.8 g/100 g wet weight and β-carotene of not less than 750 μg/100 g wet weight.

10. A method of producing a boiled green soybean according to claim 9, wherein the green soybean is cultivated with an interval of 11 cm or more between roots.

11. A method of producing a boiled green soybean according to claim 9, wherein the green soybean is cultivated with a low-phosphate fertilizer.

12. A method of producing a boiled green soybean according to claim 9, wherein the green soybean is preserved and sold for 24 hours or longer under illumination of light.

13. A method of producing a boiled green soybean, the method comprising the steps of:

selecting a green soybean containing chlorophyll a of not less than 3.8 g/100 g wet weight, or using a green soybean cultivated to contain chlorophyll a of not less than 3.8 g/100 g wet weight;

boiling the green soybean; and preserving said green soybean under illumination of light for 24 hours or more.

14. A method of producing a boiled green soybean according to claim 1, wherein the green soybean is cultivated with an interval of 11 cm or more between roots.

15. A method of producing a boiled green soybean according to claim 1, wherein the green soybean is cultivated with an interval of 11–13 cm between roots.

16. A method of producing a boiled green soybean according to claim 1, wherein the green soybean is cultivated with a low-phosphate fertilizer.

* * * * *